United States Patent [19]

Swartzendruber

[11] 4,317,430
[45] Mar. 2, 1982

[54] AUGER CONVEYOR TUBE

[75] Inventor: Ray E. Swartzendruber, Syracuse, Ind.

[73] Assignee: Chore-Time Equipment, Inc., Milford, Ind.

[21] Appl. No.: 183,062

[22] Filed: Sep. 2, 1980

[51] Int. Cl.³ .............................................. A01K 5/00
[52] U.S. Cl. .............................................. 119/52 AF
[58] Field of Search .................. 119/52 AF, 51 R, 53, 119/56 R; 138/163

[56] References Cited

U.S. PATENT DOCUMENTS

| | | | |
|---|---|---|---|
| 3,223,228 | 12/1965 | Ferris et al. | 119/52 AF |
| 3,230,933 | 1/1966 | Myers et al. | 119/52 AF |
| 3,511,215 | 5/1970 | Myers | 119/52 AF |
| 3,598,087 | 8/1971 | Ramser | 119/56 R |
| 3,757,830 | 9/1973 | Anderson et al. | 138/163 |
| 3,799,116 | 3/1974 | Hostetler | 119/52 AF |
| 3,911,868 | 10/1975 | Brembech | 119/53 |
| 4,003,339 | 1/1977 | Hostetler | 119/52 AF |

FOREIGN PATENT DOCUMENTS 2133022  1/1973  Fed. Rep. of Germany ...... 138/163

Primary Examiner—Jay N. Eskovitz
Attorney, Agent, or Firm—Trexler, Bushnell & Wolters

[57] ABSTRACT

A novel tube construction is provided for use in an auger feeder conveyor. The tube comprises a bi-edged tube sheet curved in a mediate portion to form a tube of substantially circular cross-sectional aspect. A portion adjacent a first sheet edge extends substantially radially outwardly to form a male flange. A portion adjacent a second sheet edge has a first element which extends substantially radially outwardly. That portion is reversely turned to provide a second flange element extending radially inwardly. The first and second elements thus form a female flange into which the male flange fits. In this way, a tube seam is formed which maintains the tube sheet in its cross-sectional aspect. A bell and spigot arrangement can be provided for interconnecting tube sections. Several ways are offered for arranging the tube sections in a progressively angularly offset array to encourage desired feed distribution action.

5 Claims, 12 Drawing Figures

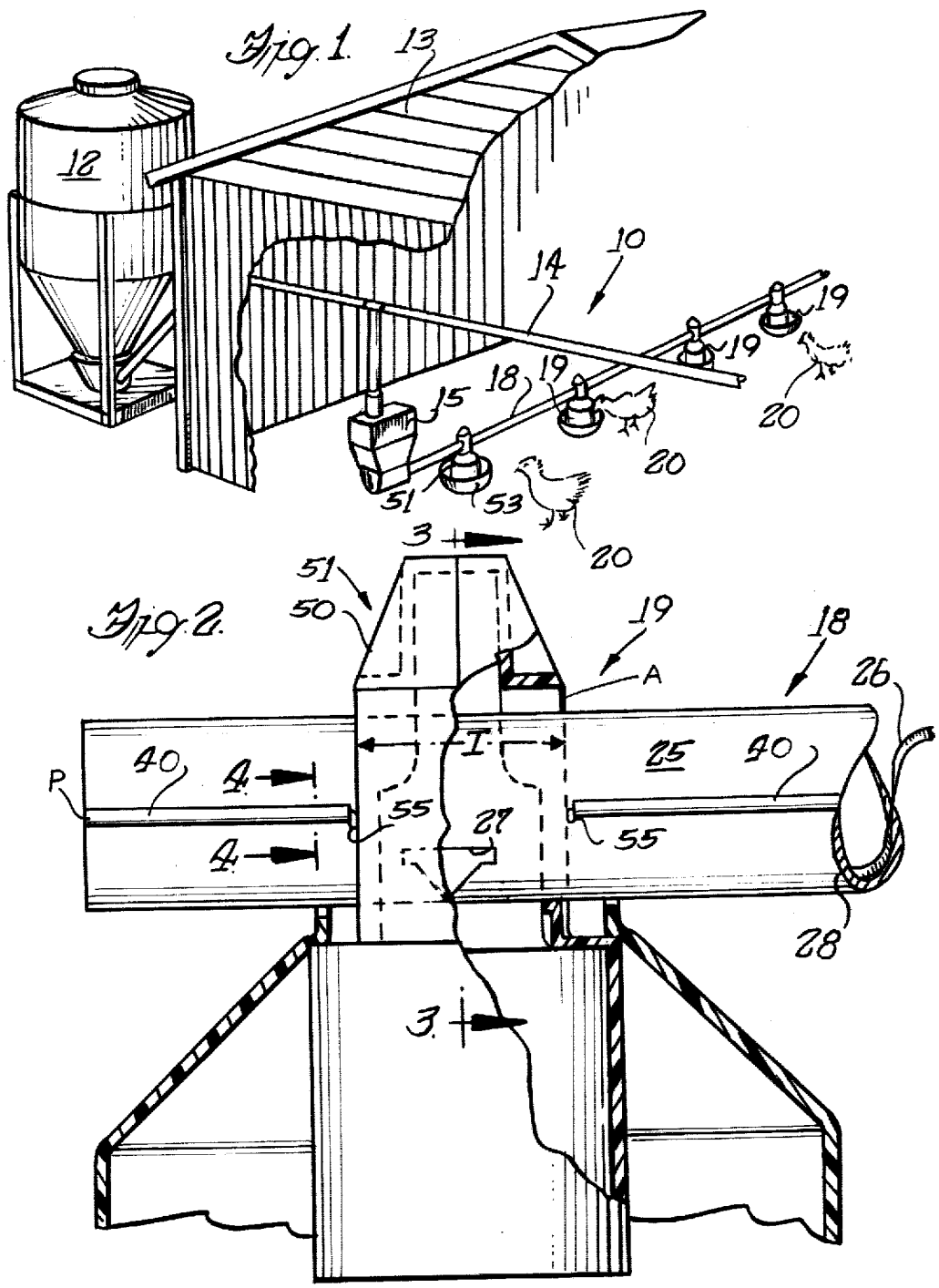

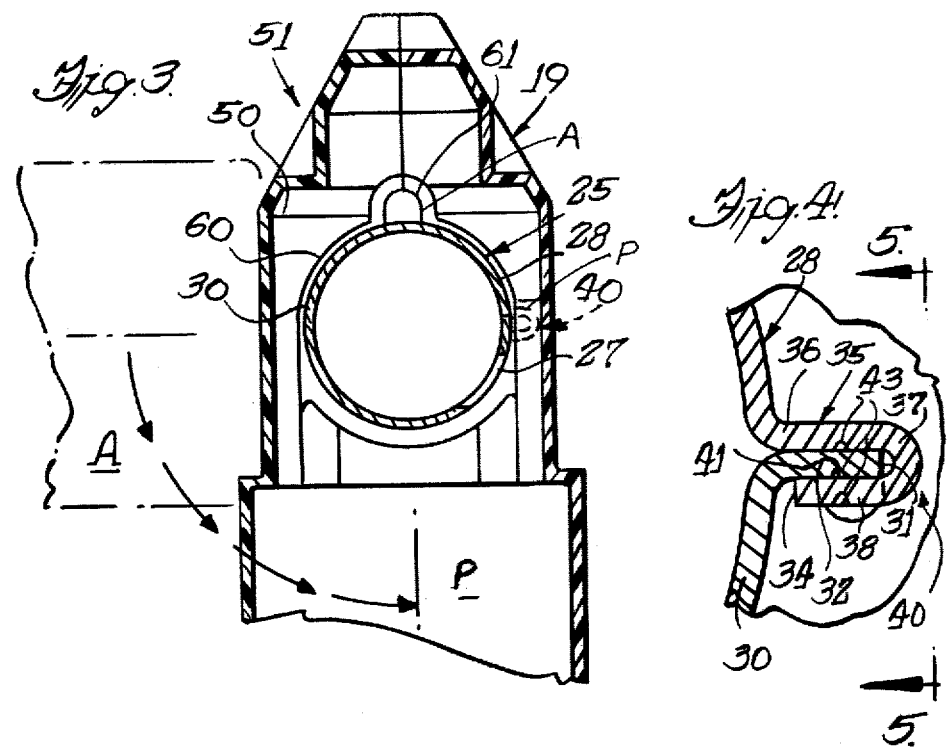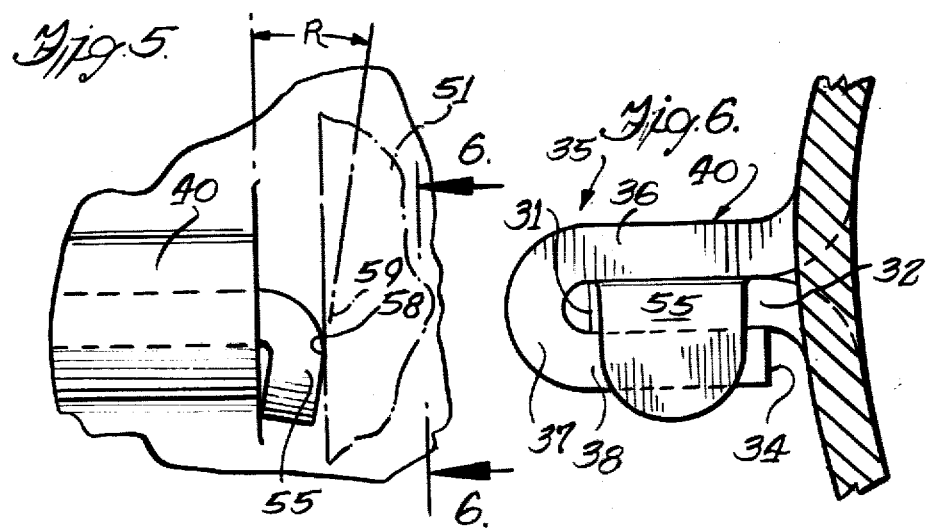

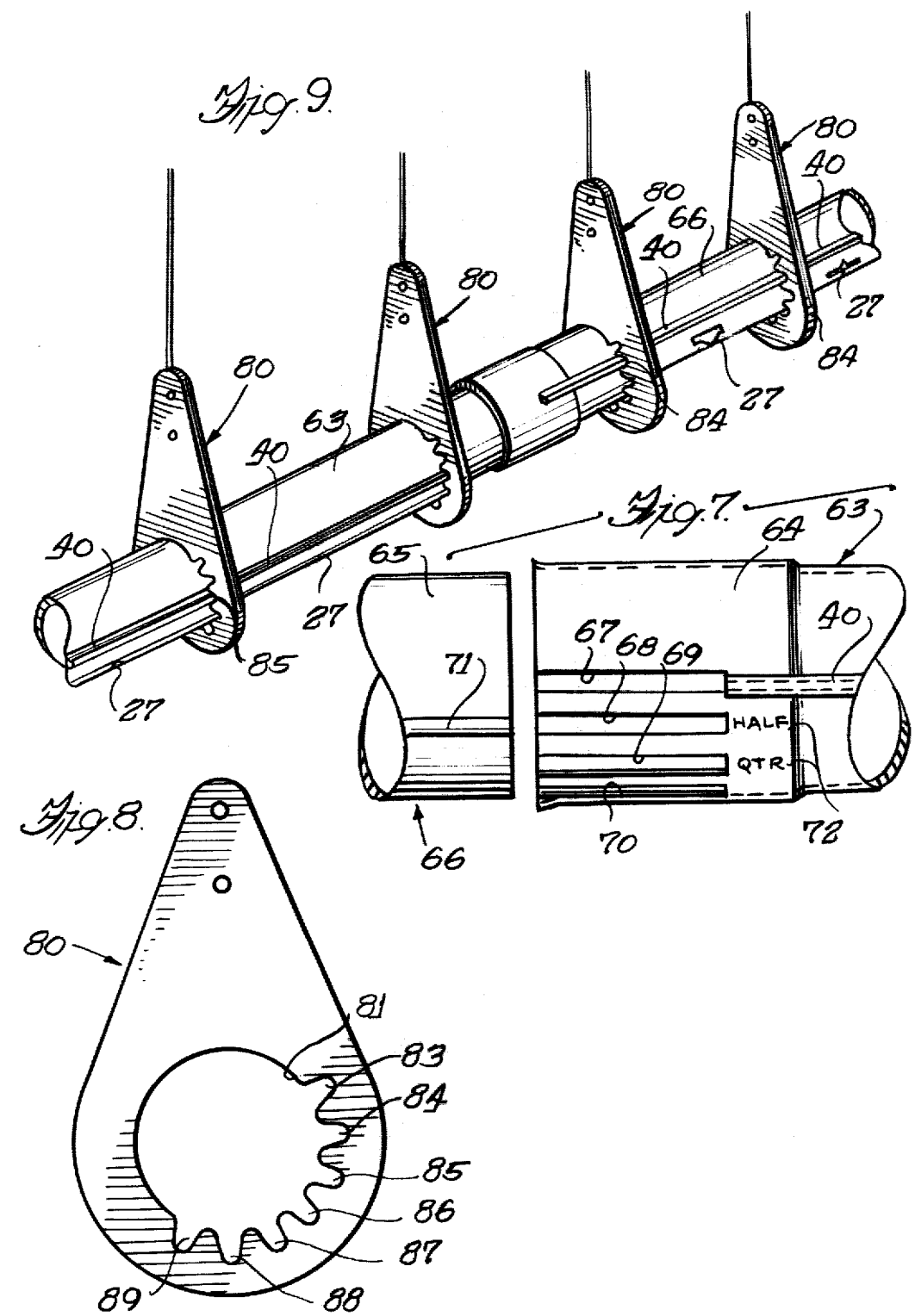

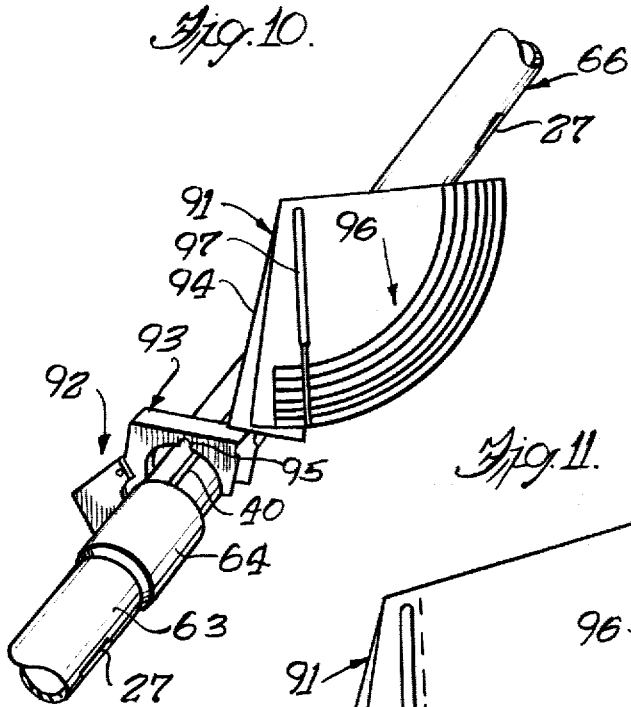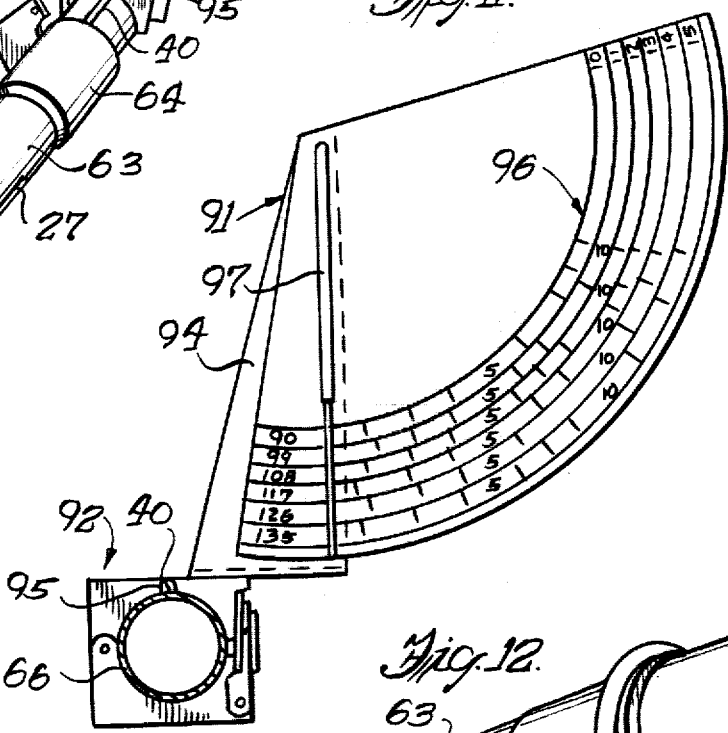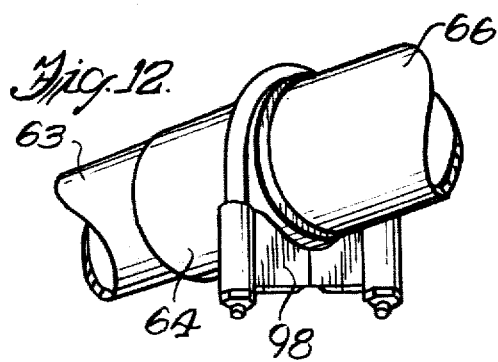

AUGER CONVEYOR TUBE

BACKGROUND OF THE INVENTION

This invention relates generally to conveyor systems for poultry feed and like materials, and more particularly concerns a low-cost, easily fabricated tube for an auger conveyor.

Auger conveyors are widely used to transport feed in poultry feeding systems. Such conveyors are disclosed in greater or lesser detail in U.S. Pat. Nos. 3,230,933; 3,511,215; 3,598,087; 3,799,116; 3,911,868; and 4,003,339. As discused there, an auger conveyor tube usually comprises a metal tube of uniform wall thickness, generally circular in its cross-sectional configuration. Along the tube, a number of holes or apertures are formed. These holes permit feed, which is being carried along the tube by a rotating auger, to be dispensed to various stations at which the poultry can obtain the feed.

It is the general object of the present invention to provide an auger tube for a feed conveyor and the like which is easy and inexpensive to fabricate. A related object is to provide such a tube which can be fabricated from low cost material. Another related object is to provide such a tube which can be fabricated without requiring welding or riveting in its fabrication.

A further object is to provide an auger tube which can be fabricated so quickly and easily as to permit more or less standard coils of sheet metal to be stored by the tube fabricator. When auger tubing is ordered, these coils of tube blank sheet metal can be quickly drawn from storage, fabricated into tubes, and then shipped without the necessity of storing the bulky finished tubes for a prolonged time.

A still further object is to provide an auger tube which, in its finished configuration, assists in properly locating associated feed-delivery means such as feeder pan assemblies, and in retaining these pan assemblies in their proper position. A related object is to provide conveyor tube sections which facilitate interconnection in a way which encourages equalized, controlled feed delivery from the many feed drop-out points provided along the completed auger conveyor.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a fragmentary perspective view showing a typical poultry feeding system utilizing feed conveyor tubes of the present invention;

FIG. 2 is a fragmentary elevational view in partial section showing the novel auger tube in further detail;

FIG. 3 is a fragmentary sectional view taken substantially in the plane of line 3—3 in FIG. 2;

FIG. 4 is a fragmentary sectional view taken substantially in the plane of line 4—4 in FIG. 2;

FIG. 5 is a developmental view taken substantially in the plane of line 5—5 in FIG. 4;

FIG. 6 is a fragmentary developmental view taken substantially in the plane of line 6—6 in FIG. 5;

FIG. 7 is a fragmentary view showing adjacent tube section ends and a bell and spigot arranged for interconnecting the sections;

FIG. 8 is an elevational view of a tube section hangar;

FIG. 9 is a perspective view showing interconnected tube sections supported by hangars like that in FIG. 8;

FIG. 10 is a perspective view showing tube sections and a gauge which can be used to angularly position the tube sections;

FIG. 11 is an elevational view of the gauge and tube shown in FIG. 10; and

FIG. 12 is a fragmentary perspective view showing a typical permanent connection between adjacent conveyor tube sections.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown a typical feed system 10. Here, a bulk storage bin 12, which may be located outside a poultry house 13, contains a large quantity of feed. This feed is transported to the interior of the house 13 by a header or main conveyor 14. Various intermediate hoppers 15 and other known mechanisms (not shown) transport and deliver the feed in a controlled manner to individual feed-dispensing line conveyors 18. These line conveyors 18 transport the feed to individual feed-offering pan assemblies or units 19, from which the poultry 20 can obtain the feed.

As illustrated more particularly in FIG. 2, this conveyor 18 here includes a conveyor tube 25 within which is disposed a helical auger member 26. When the auger member 26 is rotated, by an electric motor or other known motive means (not shown), the feed is drawn along the conveyor tube 25 and is dispensed through dispensing apertures or openings 27 formed within the wall 28 of the tube 25.

In accordance with the invention, this auger tube 25 can be formed from relatively inexpensive galvanized metal or other suitable material. Further, this fabrication can be accomplished in a very easy, rapid, inexpensive and efficient manner by roll forming machines or other known fabricating mechanisms. To this end, as can be envisioned from FIGS. 2-6, the tube can be formed of a single bi-edged tube sheet which is curved, by the metal fabricating device, in an intermediate portion to form a tube of substantially circular cross-sectional aspect. As shown in FIGS. 4 and 6, this mediate portion 30 terminates adjacent a first sheet edge 31 in a male flange element 32 which extends substantially radially outwardly from the tube body mediate element 30. A second edge 34 defines the distal end of a female flange 35. This female flange 35 can be considered to have a first element 36 extending substantially radially outwardly from the mediate tube portion 30. This first element 36 is turned smoothly into a reverse bend portion 37, and the reverse bend portion 37 folds into a second element 38 which extends substantially radially inwardly, as best shown in FIG. 4. Thus, the first element 36, reverse turn 37, and second element 38 form the female flange 35 into which the male flange 32 fits. When fitted together as shown in FIG. 4, these flanges form a seam 40 which maintains the tube sheet in the cross-sectional aspect discussed above.

To provide a permanent, tight flange interlock, this flange construction can be staked to form a permanent, but inexpensive tube seam. More specifically, the second female flange element 38 can be staked, as indicated by the stake dimple 41, to the male flange element 32. The male flange element 32 can be staked, in turn, as indicated by the dimples 43, to the first flange element 36 so as to provide a secure, rigid tube. It will be understood that the tube 25 can be formed quickly and inexpensively from planar tube blank sheets, whenever the demand arises, on metal brakes or other sheet metal forming machines. No long production times are involved. Thus, bulky, finished tube sections need not be stored by the tube fabricator; rather, the tubes can be quickly and inexpensively made whenever a tube order is received.

It has been found that this external seam 40 provides a relatively straight tube section which does not include uncontrolled angular displacements of metal within the tube sections. Moreover, any such angular displacement or spiral can be quickly and easily straightened and eliminated as the tube section comes off the roll-forming machine. This straight tube section provides accurately aligned feed drop-out holes. Accurate drop-out hole alignment can be important in providing proper feed distribution after the tube sections are assembled into a conveyor system, as described below.

In accordance with another aspect of the invention, this tube and seam construction can be used to accommodate and retain the feed-receiving pan assembly 19 in the desired location along the conveyor 18. To this end, the seam 40 extends axially along the tube as shown in FIG. 2, but is interrupted over at least one portion I of the tube 18 to accommodate an interconnector portion 50 of a feeder shell 51. It will be understood that this shell 51 receives feed from the tube 25 through the dispensing hole 27, temporarily stores that feed, and dispenses the feed in a controlled manner to the pan 53 (FIG. 1). To locate and retain the shell 51, the length l of the interruption of the seam structure 40 is sized to be substantially equal to the thickness of the interconnector portion 50 of the shell 51. The feed drop-out aperture 27 is located axially within this seam interrupted portion I so as to permit the feed to drop directly into the interior portion of the shell 50.

It is a feature of the invention that, even when the pan shell 51 is so attached to the tube 18, shell/flange wear is minimized. To this end, a tab element 55 extends in a generally perpendicular direction from a tube seam flange to provide a bearing surface 58 against which the adjacent portion 59 of the shell 51 can press. Here, this tab element 55 is formed on the male flange element 32, and is itself reversely turned at an angle R of about 10°, as shown in FIG. 5 to provide a smoothly engageable, unedged shoulder bearing surface. Nevertheless, the plane of the tab 55 will be perceived to be generally parallel to the cross-section of the tube 18 to provide maximum tab/shell bearing area.

The interconnector portion 50 of the shell 51 is formed to define a generally circular hole 60 in which the tube 25 fits. A recess 61 communicates with the hole 60 and provides a space into which the seam 40 can fit as the tube 40 is slid into the hole 60 during system assembly. More specifically, the shell 51 can be assembled on the tube by sliding the tube into the hole 60 until the shell 51 is placed on and over the tube 25 in the desired axial position. At this point, the tube is rotated from its assembly position A shown in FIG. 3 to the permanent position P. The interengagement of the seams 40 and tabs 55 with the shell interconnector portion 50 there locks the shell 51 in the desired location.

In accordance with another aspect of the invention, adjacent tube sections can be connected to one another in a way which encourages equalized, controlled feed dispensing action from the long conveyor tube formed by the interconnected tube sections. In general, it has been found desirable to interconnect the tube sections so as to locate the feed-dispensing drop-out holes formed in the tubes in a helical array of extended pitch. Such arrangements are described in U.S. Pat. Nos. 3,598,087; 3,799,116; and others. The tube section construction described here permits the use of at least three more or less independent methods of tube section interconnection which quickly, easily and accurately provide such helical dispensing hole arrays.

First, one end of each tube section 63 can be provided with a female bell portion 64 of expanded inner diameter which will receive an unexpanded male spigot portion 65 of an adjacent tube section 66, in a bell-and-spigot interconnection, as shown in FIG. 7. Axially extending slots 67, 68, 69, 70 can be provided in the bell 64 to receive the seam 71 on the adjacent tube spigot 65. If desired, these slots can be provided with identifier markings 72 which act as reminders or indicators to the assembling marksmen.

Second, as shown in FIGS. 8 and 9, hangars 80 can be provided with apertures 81 sized to receive the tube sections 63 and 66. Extending from each aperture 81 are a number of recesses 83-89, any one of which will accommodate the radially extending tube section seam 40. By inserting the seam 40 of adjacent tube sections 63,66 into different but adjacent hangar recesses 84, 85, a corresponding angular twist or offset can be provided to the tube sections. A corresponding angular offset is thus provided to the feed dispensing apertures or openings 27. If desired, the bell-slot arrangement described above can be provided for added tube section interconnection rigidity. If these bell slots 67-70 are not provided, however, and if the seam structure 40 and the adjacent spigot 65 is eliminated, a recess array 83-89 of small angular increments can be provided. A small angular offset or change from tube section to adjacent tube section is useful if the entire conveyor 80 is of extended length.

Third, the tube sections can be angularly located or positioned by means of a gauge 91, as indicated in FIG. 10. This gauge 91 can be constructed and used as described in U.S. Pat. No. 3,799,116. A gauge attachment clamp 92 can be provided with a top portion 93 affixed to a gauge scale back plate 94. This clamp top portion 93 is here provided with a recess 95 to accommodate and engage the tube section seam 40. When the recess 95 engages the tube seam 40 as shown in FIG. 11, the entire gauge, including the scale back plate 94, the scales 96, and indicator or pointer 97 are angularly located with respect to the tube seam 40 and dispensing drop-out holes 27. In this way, the tube can be properly angularly positioned with respect to the adjacent tube section 63 by rotating the tube 63 and temporarily affixed scale 96 to coincide with an actual angular position indicated by the plumb pointer 97. The tube sections can then be permanently secured together in the desired angular interrelationship as by a saddle clamp 98, as indicated in FIG. 12. Thus, the inexpensive yet rigid tubes 63 and 66 provide a conveyor assembly having desirable feed-dispensing characteristics.

The invention is claimed as follows:

1. A tube structure for use in an auger conveyor, the tube structure having at least two adjacent stationary tube sections, each tube section comprising, in combination, a bi-edged tube sheet curved in a mediate portion to form a tube of substantially circular cross-sectional aspect, a portion adjacent a first sheet edge extending substantially radially outwardly to form a male flange, and a portion adjacent a second sheet edge having a first element extending substantially radially outwardly, that portion being reversely turned to provide a second element extending radially inwardly, the first and second elements thus forming a female flange into which the male flange fits, to thereby form a seam and maintain the tube sheet in its cross-sectional aspect, the male flange element being provided with a tab element spaced apart from the circular tube sheet mediate portion and extending in a generally perpendicular direction from the male flange element to provide a bearing surface for flange tab/feed receiving means interengagement, the seam being axially interrupted over at least one portion of the tube section to accommodate the connection of feed receiving means to the tube section, the tube sheet defining a feed drop-out aperture located axially within the tube seam interrupted portion but being angularly spaced therefrom to discourage the collection and retention of feed at the tube seam, one tube section having an end bell portion of expanded inner diameter to receive an unexpanded diameter spigot end portion of the adjacent tube section, the bell portion including a plurality of slots, the tube section structure further including identifier means permanently applied to at least one tube section for identifying the bell slot into which an adjacent tube section spigot seam should be inserted to provide an interconnected tube array of progressively angularly offset tube sections.

2. A tube structure for use in an auger conveyor, the tube structure being a stationary tube section and comprising, in combination, a bi-edged tube sheet curved in a mediate portion to form a tube of substantially circular cross-sectional aspect, a portion adjacent a first sheet edge extending substantially radially outwardly to form a male flange, and a portion adjacent a second sheet edge having a first element extending substantially radially outwardly, that portion being reversely turned to provide a second element extending radially inwardly, the first and second elements thus forming a female flange into which the male flange fits, to thereby form a seam and maintain the tube sheet in its cross-sectional aspect, the male flange element being provided with a tab element spaced apart from the circular tube sheet mediate portion and extending in a generally perpendicular direction from the male flange element to provide a bearing surface for flange/tab feed receiving means interengagement, the seam being axially interrupted over at least one portion of the tube section to accommodate the connection of feed receiving means to the tube section, the tube sheet defining a feed drop-out aperture located axially within the tube seam interrupted portion but being angularly spaced therefrom to discourage the collection and retention of feed at the tube seam.

3. A tube structure according to claim 1 or 2 including a plurality of tube section hangars, each hangar defining a tube-section-accommodating aperture and a tube-section-seam-accommodating recess communicating with the aperture.

4. A tube structure according to claim 3 wherein each hangar defines a plurality of seam-accommodating recesses of angularly spaced apart locations, whereby to permit adjacent tube sections to be carried by adjacent hangars in angularly offset positions, the angularly offset tube positions encouraging correct feed dispensing action from the conveyor.

5. A tube structure according to claim 1 or 2 including a gauge comprising attachment means for temporarily attaching the gauge to a tube section, the attachment means defining a recess adapted for registry with the tube section seam, scale means affixed to the attachment means for indicating the desired angular position of the tube and tube outlet, an indicator means cooperable with the scale means for indicating the actual angular position of the tube, tube outlet, and feed drop-out aperture defined in the tube section.

* * * * *